(12) United States Patent
Nakarmi et al.

(10) Patent No.: US 11,595,822 B2
(45) Date of Patent: Feb. 28, 2023

(54) IDENTIFIERS IN A WIRELESS COMMUNICATION SYSTEM

(71) Applicant: Telefonaktiebolaget LM Ericsson (publ), Stockholm (SE)

(72) Inventors: Prajwol Kumar Nakarmi, Sollentuna (SE); Mats Näslund, Bromma (SE); Karl Norrman, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 132 days.

(21) Appl. No.: 16/650,619

(22) PCT Filed: Oct. 4, 2018

(86) PCT No.: PCT/EP2018/077054
§ 371 (c)(1),
(2) Date: Mar. 25, 2020

(87) PCT Pub. No.: WO2019/068832
PCT Pub. Date: Apr. 11, 2019

(65) Prior Publication Data
US 2020/0245139 A1 Jul. 30, 2020

Related U.S. Application Data

(60) Provisional application No. 62/567,789, filed on Oct. 4, 2017.

(51) Int. Cl.
*H04M 1/66* (2006.01)
*H04W 12/75* (2021.01)
(Continued)

(52) U.S. Cl.
CPC ............. *H04W 12/75* (2021.01); *H04W 8/08* (2013.01); *H04W 12/02* (2013.01); *H04W 12/80* (2021.01);
(Continued)

(58) Field of Classification Search
CPC ..... H04W 12/02; H04W 12/06; H04W 12/80; H04W 12/75
See application file for complete search history.

(56) References Cited

U.S. PATENT DOCUMENTS

2006/0009222 A1* 1/2006 Kiviranta ............... H04W 24/08
455/436
2007/0197212 A1* 8/2007 Marsico .................. H04W 4/16
455/433

(Continued)

OTHER PUBLICATIONS

3rd Generation Partnership Project, "3rd Generation Partnership Project; Technical Specification Group Services and System Aspects; Security Architecture and Procedures for 5G System (Release 15)", Technical Specification, 3GPP TS 33.501 V0.3.0, Aug. 1, 2017, pp. 1-44, 3GPP.

(Continued)

*Primary Examiner* — Shantell L Heiber
(74) *Attorney, Agent, or Firm* — Coats & Bennett, PLLC

(57) ABSTRACT

A method performed by a resolver in a core network of a wireless communication system, where the method comprise: receiving, from a requester in the core network, a request to resolve a provided identifier that is one of a subscription identifier and a pseudonym identifier serving in the core network as a pseudonym for the subscription identifier; and transmitting, to the requester as a response to the request, a resolved identifier that is the other of the subscription identifier and the pseudonym identifier.

20 Claims, 8 Drawing Sheets

Figure 1:
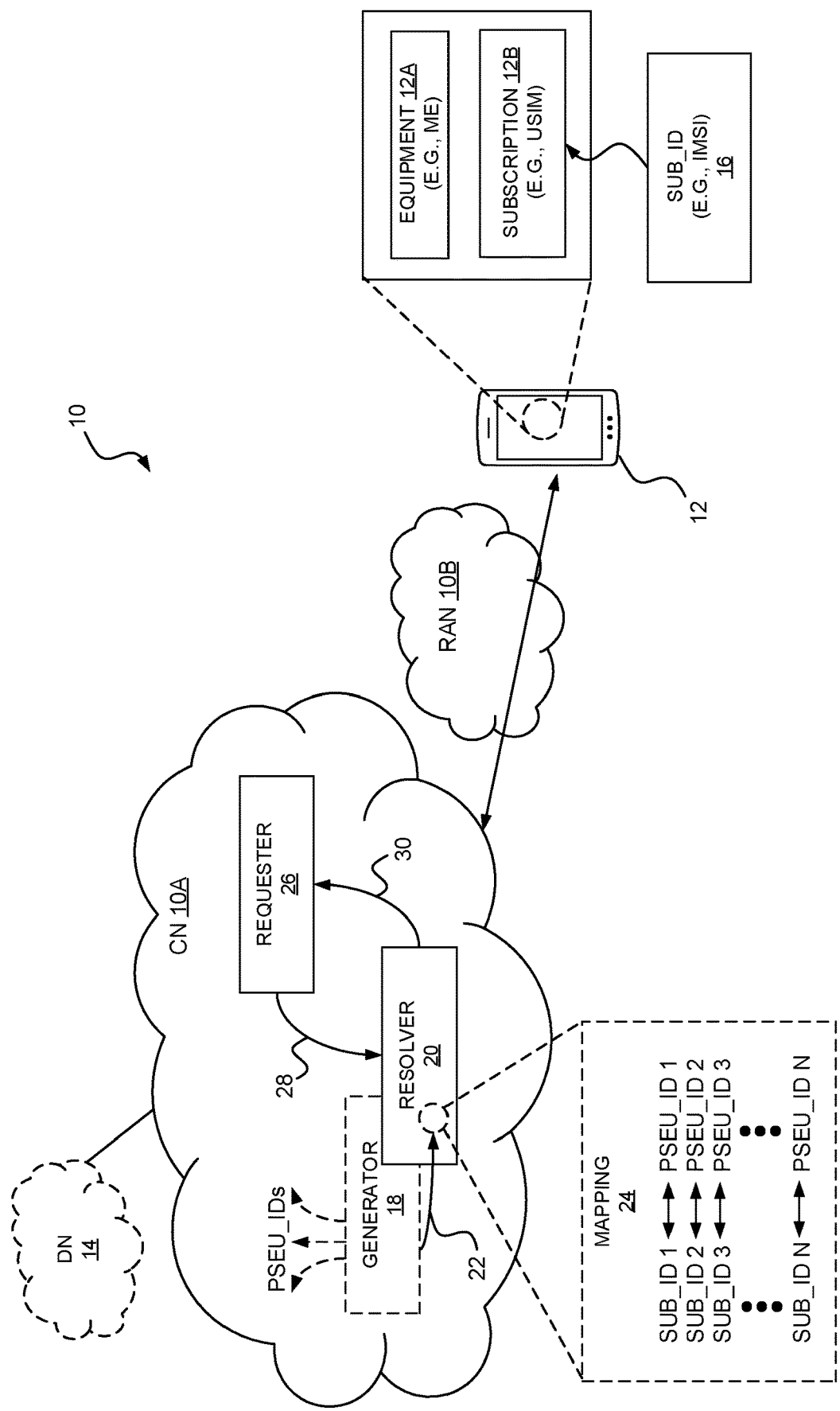

(51) Int. Cl.
*H04W 8/08* (2009.01)
*H04W 12/02* (2009.01)
*H04W 48/16* (2009.01)
*H04W 12/80* (2021.01)
*H04L 101/654* (2022.01)

(52) U.S. Cl.
CPC ....... *H04W 48/16* (2013.01); *H04L 2101/654* (2022.05)

(56) References Cited

U.S. PATENT DOCUMENTS

| | | | | |
|---|---|---|---|---|
| 2008/0090555 A1* | 4/2008 | Patel | ................ | H04L 67/563 |
| | | | | 455/414.1 |
| 2010/0223222 A1* | 9/2010 | Zhou | ................ | H04L 12/14 |
| | | | | 706/47 |
| 2011/0098043 A1* | 4/2011 | Yu | ................ | H04W 60/00 |
| | | | | 455/435.1 |
| 2013/0078950 A1* | 3/2013 | Liao | ................ | H04W 12/086 |
| | | | | 455/411 |
| 2013/0083653 A1* | 4/2013 | Jain | ................ | H04W 28/0247 |
| | | | | 370/230 |
| 2013/0196630 A1* | 8/2013 | Ungvari | ................ | H04W 48/02 |
| | | | | 455/411 |
| 2013/0225130 A1* | 8/2013 | Rost | ................ | H04W 4/70 |
| | | | | 455/411 |
| 2014/0044019 A1* | 2/2014 | Anthony, Jr. | ................ | H04L 63/306 |
| | | | | 370/259 |
| 2014/0051393 A1* | 2/2014 | Mildh | ................ | H04W 12/08 |
| | | | | 455/411 |
| 2016/0065419 A1* | 3/2016 | Szilagyi | ................ | G06F 11/3006 |
| | | | | 709/224 |
| 2017/0134459 A1* | 5/2017 | Shetty | ................ | H04L 65/80 |
| 2017/0251357 A1* | 8/2017 | Iwai | ................ | H04W 4/00 |
| 2018/0199303 A1* | 7/2018 | Vayilapelli | ................ | H04W 8/04 |
| 2019/0223018 A1* | 7/2019 | Norrman | ................ | H04W 8/08 |
| 2019/0274110 A1* | 9/2019 | Luft | ................ | H04L 63/0884 |
| 2019/0380028 A1* | 12/2019 | Rasanen | ................ | H04W 12/02 |
| 2020/0059989 A1* | 2/2020 | Velev | ................ | H04W 36/12 |
| 2021/0153111 A1* | 5/2021 | Theimer | ................ | H04L 12/4641 |

OTHER PUBLICATIONS

3rd Generation Partnership Project, "3rd Generation Partnership Project; Technical Specification Group Services and System Aspects; Study on Subscriber Privacy Impact in 3GPP; (Release 13)", Technical Report, 3GPP TR 33.849 V1.0.0, Feb. 1, 2015, pp. 1-29, 3GPP.

Nokia, "Subscriber Identity Privacy and Its Management", 3GPP TSG SA WG3 (Security) Meeting #88, Dali, China, Aug. 7, 2017, pp. 1-3, S3-171953, 3GPP.

Ericsson et al., "Updating Solution #7.3", 3GPP TSG-SA3 Meeting #85, Santa Cruz de Tenerife, Spain, Nov. 7, 2016, pp. 1-6, S3-161853, 3GPP.

Nokia, "New KI—Security Aspects of Avoiding IMSI Paging in 5G", 3GPP TSG-SA WG3 Meeting #86bis, Busan, South Korea, Mar. 27, 2017, pp. 1-2, S3-170662, 3GPP.

3rd Generation Partnership Project, "3rd Generation Partnership Project; Technical Specification Group Services and System Aspects; Study on the Security Aspects of the Next Generation System (Release 14)", Technical Report, 3GPP TR 33.899 V1.3.0, Aug. 1, 2017, pp. 1-605, 3GPP.

* cited by examiner

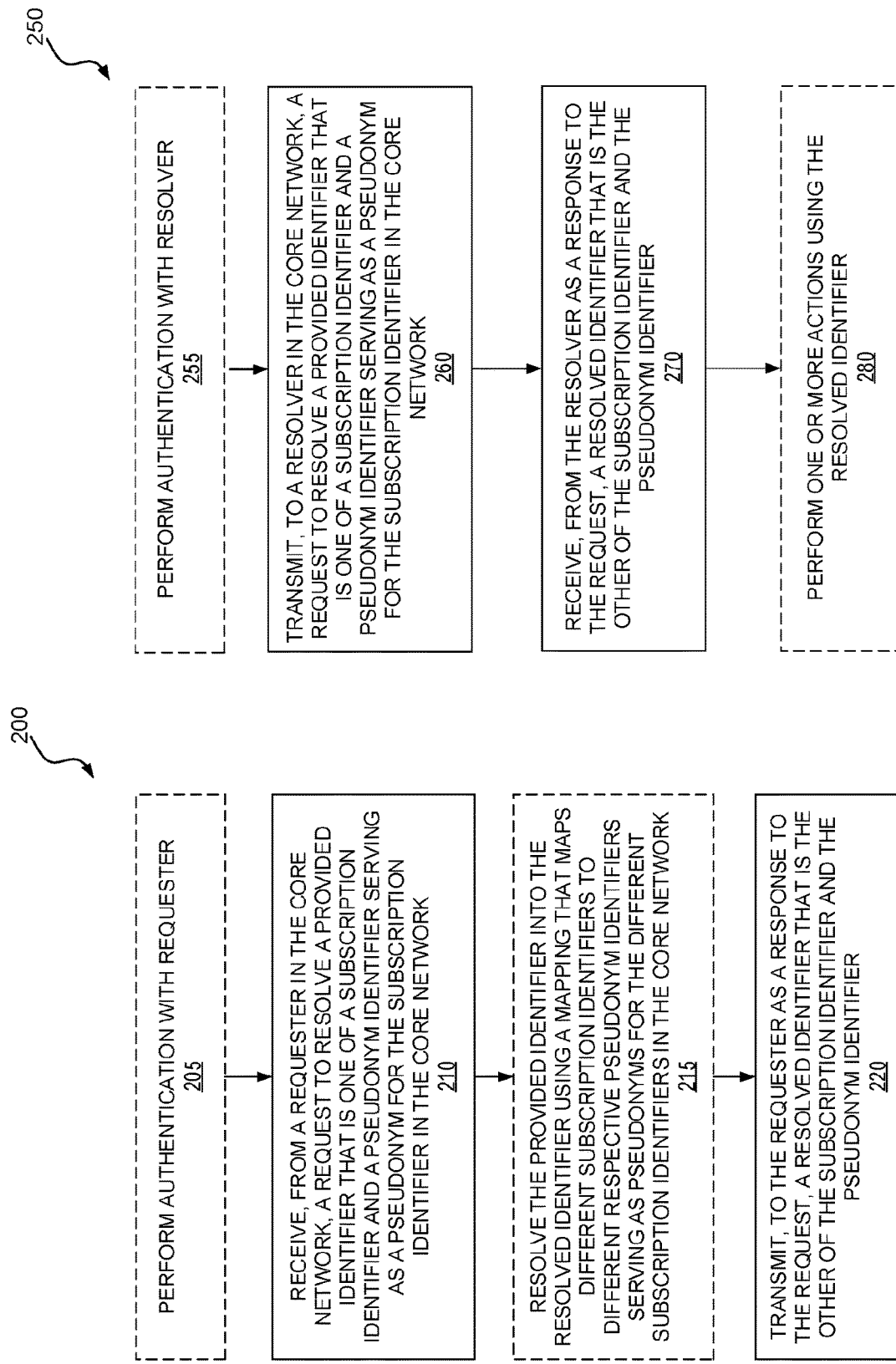

IDENTIFIERS IN A WIRELESS COMMUNICATION SYSTEM

BACKGROUND

A wireless communication system uses subscription identifiers to identify its subscribers (or associated universal subscriber identity modules, USIMs). The core network for example uses a long-term or permanent subscription identifier called an International Mobile Subscription Identifier (IMSI) as a stable and reliable identifier of subscribers. The system may however avoid transmitting the IMSI over-the-air as much as possible, in order to stop radio interface eavesdroppers from maliciously tracking a subscriber by observing the subscriber's identifier being transmitted in different locations. Instead, the system may use a temporary or short-term identifier such as a Globally Unique Temporary Identifier (GUTI) that is frequently refreshed to make tracking more difficult.

Further enhancing subscription identifier privacy in these and other contexts throughout the system nonetheless still proves challenging, in part because many network nodes and/or functions must still resort to using a long-term subscription identifier.

SUMMARY

Some embodiments herein leverage a pseudonym identifier to be used as a pseudonym in a core network for a subscription identifier, in order to limit the subscription identifier's use to certain nodes or functions in the core network, e.g., to those nodes or functions that unequivocally require the subscription identifier, such as e.g. Lawful Interception (LI) and/or charging. Some embodiments in this regard employ a centralized or distributed resolver that resolves requests for translating between a subscription identifier and the pseudonym identifier serving as a pseudonym for that subscription identifier. Concealing the subscription identifier behind the pseudonym identifier and revealing the subscription identifier to select nodes or functions in the core network advantageously enhances subscriber privacy in the core network while maintaining system functionality that relies on stable subscriber identifiers.

More particularly, embodiments herein include a method performed by a resolver in a core network of a wireless communication system. The method comprises receiving, from a requester in the core network, a request to resolve a provided identifier that is one of a subscription identifier and a pseudonym identifier, serving as a pseudonym in the core network for the subscription identifier. The method may also comprise transmitting, to the requester as a response to the request, a resolved identifier that is the other of the subscription identifier and the pseudonym identifier. In some embodiments, for example, the method may further comprise resolving the provided identifier into the resolved identifier using a mapping that maps different subscription identifiers to different respective pseudonym identifiers, serving as pseudonyms for the different subscription identifiers in the core network.

Other embodiments herein correspondingly include a method performed by a requester in a core network of a wireless communication system. The method comprise transmitting, to a resolver in the core network, a request to resolve a provided identifier that is one of a subscription identifier and a pseudonym identifier serving as a pseudonym in the core network for the subscription identifier. The method also comprise receiving, from the resolver as a response to the request, a resolved identifier that is the other of the subscription identifier and the pseudonym identifier.

According to another aspect, a resolver is configured for use in a core network of a wireless communication system. More specifically, the resolver is configured to receive a request to resolve a provided identifier that is one of a subscription identifier and a pseudonym identifier serving in the core network as a pseudonym for the subscription identifier, from a requester in the core network, and to transmit a resolved identifier that is the other of the subscription identifier and the pseudonym identifier to the requester as a response to the request.

According to yet another embodiment a resolver is configured for use in a core network of a wireless communication system, where the resolver comprise processing circuitry and a memory, where the memory contain instructions executable by the processing circuitry, and whereby the resolver is configured to receive a request to resolve a provided identifier that is one of a subscription identifier and a pseudonym identifier serving in the core network as a pseudonym for the subscription identifier, from a requester in the core network, and to transmit a resolved identifier that is the other of the subscription identifier and the pseudonym identifier, to the requester as a response to the request.

According to yet another embodiment, a resolver is configured for use in a core network of a wireless communication system, the resolver comprising a receiving module for receiving a request to resolve a provided identifier that is one of a subscription identifier and a pseudonym identifier serving in the core network as a pseudonym for the subscription identifier, from a requester in the core network, and a transmitting module for transmitting a resolved identifier that is the other of the subscription identifier and the pseudonym identifier, to the requester as a response to the request.

According to another aspect, a requester is configured for use in a core network of a wireless communication system, where the requester is configured to transmit a request to resolve a provided identifier that is one of a subscription identifier and a pseudonym identifier, serving in the core network as a pseudonym for the subscription identifier, to a resolver in the core network, and to receive a resolved identifier that is the other of the subscription identifier and the pseudonym identifier, from the resolver as a response to the request.

According to another embodiment, a requester is configured for use in a core network of a wireless communication system, where the requester comprise processing circuitry and a memory, where the memory contain instructions executable by the processing circuitry, whereby the requester is configured to transmit a request to resolve a provided identifier that is one of a subscription identifier and a pseudonym identifier serving in the core network as a pseudonym for the subscription identifier, to a resolver in the core network, and to receive a resolved identifier that is the other of the subscription identifier and the pseudonym identifier, from the resolver as a response to the request.

According to yet another embodiment, a requester is configured for use in a core network of a wireless communication system, wherein the requester comprise a transmitting module for transmitting a request to resolve a provided identifier that is one of a subscription identifier and a pseudonym identifier serving in the core network as a pseudonym for the subscription identifier, to a resolver in the core network, and a receiving module for receiving a resolved identifier that is the other of the subscription identifier and the pseudonym identifier, from the resolver as a response to the request.

Still other embodiments include corresponding resolver, requester, and respective computer programs.

DETAILED DESCRIPTION

FIG. 1 illustrates a wireless communication system 10 which according to some embodiments may be e.g. a $5^{th}$ Generation (5G) system, such as e.g. a New Radio (NR) system. As shown, a wireless communication device 12 connects to a core network (CN) 10A of the system 10 via a radio access network (RAN) 10B. The core network 10A in turn connects the wireless communication device 12 to a data network (DN) 14, which may be internal or external to the core network 10A for providing operator services, Internet access, third-party services, etc.

The wireless communication device 12 is shown as comprising multiple components 12A and 12B which are logically, functionally, or physically associated with the device's equipment and the device's subscription, respectively. In some embodiments, the device's equipment 12A may be represented e.g. as a Mobile Equipment (ME), whereas the device's subscription 12B may be associated with the wireless communication device 12 e.g. via a Universal Subscriber Identity Module (USIM). Such a USIM may be modular with respect to the ME (e.g., removable from the ME), or form part of the ME (e.g. an arrangement capable of storing an electronic SIM (eSIM)). Other devices, such as e.g. Internet of Things (IoT) devices may not have a USIM, such that the subscription 12B is associated with the device as a whole.

The wireless communication device 12 in this regard may be associated with a subscription identifier 16, abbreviated in FIG. 1 as SUB_ID 16. This subscription identifier 16 identifies a subscription 12B associated with the wireless communication device 12, e.g., by identifying a USIM associated with the device 12. In fact, the subscription identifier 16 may identify the subscription 12B on a long-term or permanent basis so as to be a fairly stable and/or un-mutable identifier. In some embodiments, for instance, the subscription identifier 16 is an International Mobile Subscription Identifier (IMSI). Alternatively, the subscription identifier 16 may be a portion of the IMSI, e.g., in the form of a mobile identification number (MIN) or mobile subscription identification number (MSIN).

No matter the subscription identifier's particular form, though, the system 10 according to some embodiments herein advantageously limits exposure of the subscription identifier 16 in the core network 10A, e.g., to only those core network nodes or functions that unequivocally require the subscription identifier 16, such as those used for Lawful Interception (LI) and/or charging. Some embodiments in this regard conceal the subscription identifier 16 behind a pseudonym identifier that serves as a pseudonym for the subscription identifier 16 in the core network 10A. The pseudonym identifier may be a type of identifier that is periodically or occasionally updated or refreshed, such as e.g. with a period between updates being set to 1 week, 2 weeks or 1 month, so as to serve as a shorter-term identifier than the subscription identifier 16. The pseudonym identifier may even be used only internally to the core network 10A (i.e., not used outside of the core network 10A, even by the user equipment), so as to not only avoid over-the-air transmission of the pseudonym identifier but also to enable the pseudonym identifier to be dedicated or otherwise tailored specifically for this purposes herein. Accordingly, the pseudonym identifier used internally to the core network 10A in some embodiments herein is different than any other pseudonym identifier that may be used outside of the core network 10A (e.g., such as a global unique temporary identity, GUTI, transmitted over-the-air). In any event, the subscription identifier 16 may be revealed to and/or entrusted with certain select nodes or functions in the core network 10A, but other nodes or functions in the core network 10A may be confined to using the pseudonym for that subscription identifier 16. Limiting exposure of the subscription identifier 16 in this way may advantageously enhance subscriber privacy, e.g., in the sense that fewer vulnerabilities exist in the core network 10A for attackers to exploit and access the subscription identifier 16. At the same time, using pseudonym identifiers preserves system functionality or nodes that rely on stable subscription identifiers, even for functionality or nodes that are publicly accessible (e.g., by any wireless communication device). Moreover, using pseudonyms for subscription identifiers in at least a portion of the core network 10A makes the core network 10A more robust to size and/or format changes in the subscription identifiers (e.g., to accommodate different types of devices, such as internet-of-things devices or other devices that may not have a USIM.

To support this pseudonym identifier usage, the system 10 as shown may include a generator 18 configured to generate pseudonym identifiers that serve as respective pseudonyms for subscription identifiers in the core network 10A. Generation of a pseudonym identifier to serve as a pseudonym for a subscription identifier 16 associated with a user equipment 12 may for instance be triggered by attachment, registration, and/or authentication of the user equipment 12 with the system 10. In this case, then, the pseudonym identifier serving as a pseudonym for a certain subscription identifier may be refreshed or updated each time the associated user equipment 12 attaches, registers, and/or authenticates with the system 10. Alternatively or additionally, the pseudonym identifier generation may be triggered upon mobility registration update, tracking area update, periodic registration update, service request, expiration of a timer (e.g., since last pseudonym identifier refresh), and/or a defined number of certain non-access stratum (NAS) transactions occurring.

No matter the particular trigger for pseudonym generation, the generated pseudonyms may then be directly or indirectly propagated amongst equipment or functions in the core network 10A for use, e.g., in lieu of the corresponding subscription identifiers. The generated pseudonyms may be propagated in this way in advance or on an as-needed basis. For example, in New Radio (NR) embodiments, when the user plane function (UPF) and/or session management function (SMF) establishes resources for the wireless communication device 12, pseudonym identifier may be provided to the UPF and/or SMF instead of the subscription identifier, e.g., to conceal the subscription identifier from the UPF and/or SMF. This way, the UPF and/or SMF may allocate resources and associate them with the pseudonym identifier rather than the subscription identifier.

Figure 2A:
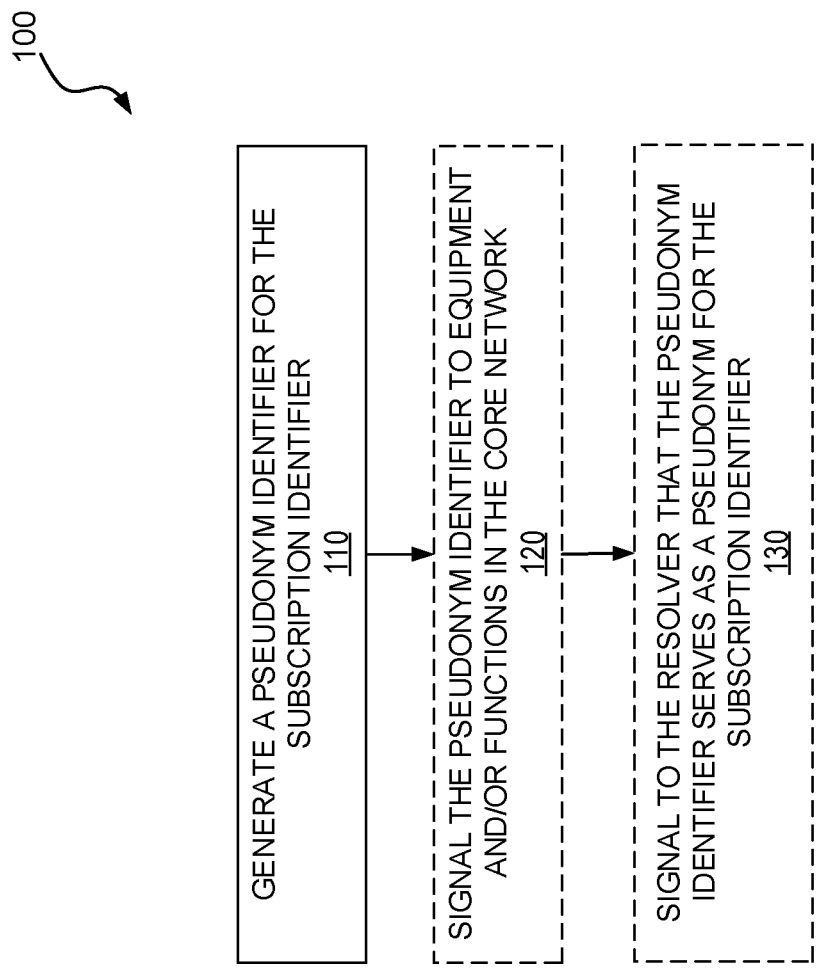

The system 10 also includes a resolver 20 in the core network 10A. The resolver 20 in some embodiments is collocated with the generator 18, e.g., both the generator 18 and resolver 20 may be implemented by the same core network equipment, such as equipment that performs an access and mobility management function (AMF). In other embodiments, though, the generator 18 may transmit signaling 22 to the resolver 20 indicating which pseudonym identifiers serve as pseudonyms for which subscriber identifiers. In either case, the resolver 20 may record or otherwise maintain a mapping 24 that maps different subscription identifiers to different respective pseudonym identifiers serving as pseudonyms for the different subscription identifiers in the core network 10A. FIG. 1 for example shows the mapping 24 as mapping subscription identifier SUB_ID 1 with pseudonym identifier PSEU_ID 1, mapping subscription identifier SUB_ID 2 with pseudonym identifier PSEU_ID 2, mapping subscription identifier SUB_ID 3 with pseudonym identifier PSEU_ID 3, and so on. The mapping 24 may be embodied in any sort of data structure at the resolver 20, e.g., in the form of a database or look-up table(s), or may be embodied in defined rules for dynamically calculating or forming pseudonym identifiers from subscription identifiers and vice versa. Whether based on this mapping or otherwise, though, the resolver 20 effectively translates between a subscription identifier and the pseudonym identifier serving as a pseudonym for that subscription identifier in the core network 10A. The resolver 20 in this sense may function as a point of translation or interconnect between nodes/functions privy to subscription identifiers and nodes/functions confined to using pseudonym identifiers. FIGS. 2A-2C for example illustrate processing performed in the core network 10A in some embodiments.

As shown in FIG. 2A, processing 100 by the generator 18 includes the pseudonym identifier to serve as the pseudonym for the subscription identifier 16 (Block 110). This generation or a subsequent generation may effectively update the pseudonym identifier that serves as the pseudonym for that subscription identifier 16, e.g., responsive to the wireless communication device 12 associated with the subscription identifier 16 initially registering with or initially attaching to the wireless communication system 10. Regardless, the processing 100 may further include signaling the pseudonym identifier to equipment and/or functions in the core network 10A (Block 120), e.g., so that those equipment and/or functions may use the pseudonym identifier in lieu of the subscription identifier to which the equipment and/or functions may not be privy. In embodiments where the generator 18 and resolver 20 are not collocated, processing 100 may alternatively or additionally include signaling to the resolver 20 that the pseudonym identifier serves as a pseudonym for the subscription identifier 16 (Block 130), e.g., by signaling at least a portion of mapping 24 to the resolver 20.

As shown in FIG. 2B, processing 200 by the resolver 20 may include receiving, from a requester 26 in the core network 10A, a request 28 to resolve a provided identifier that is one of a subscription identifier 16 and a pseudonym identifier serving as a pseudonym for the subscription identifier 16 in the core network 10A (Block 210). The provided identifier may for instance be included in, or otherwise referenced by, the request 28. Regardless, the processing 200 by the resolver 20 further includes transmitting, to the requester 26 as a response to the request 28, a resolved identifier 30 that is the other of the subscription identifier 16 and the pseudonym identifier (Block 220). That is, in embodiments where the provided identifier is the subscription identifier 16, the resolved identifier 30 transmitted as a response to the request 28 is the pseudonym identifier serving as a pseudonym for the subscription identifier 16. Conversely, in embodiments where the provided identifier is a pseudonym identifier, the resolved identifier 30 transmitted as a response to the request 28 is the subscription identifier 16 for which the pseudonym identifier serves as a pseudonym. Accordingly, in some embodiments, the processing 100 by the resolver 20 may include resolving the provided identifier into the resolved identifier 30 using mapping 24 (Block 215).

FIG. 2C illustrates corresponding processing 250 performed by the requester 26. The processing 250 at the requester 26 includes transmitting, to the resolver 20 in the core network 10A, the request 28 to resolve the provided identifier that is one of a subscription identifier 16 and a pseudonym identifier, serving as a pseudonym for the subscription identifier 16 in the core network 10A (Block 260). Processing 200 further includes receiving, from the resolver 20 as a response to the request 28, the resolved identifier 30 that is the other of the subscription identifier 16 and the pseudonym identifier (Block 270).

Note that the resolver 20 in some embodiments is configured to only respond to authorized requesters and/or authorized requests, e.g., so as to effectively impose access control on subscription identifiers in the core network 10A. FIGS. 2B-2C in this regard show that in some embodiments the resolver 20 and requester 26 perform authentication with one another (Blocks 205 and 255), e.g., using schemes such as Open Authorization (OAuth) or by replying to requests, using secure protocols such as e.g. Hypertext Transfer Protocol (HTTP) protected by Transport Layer Security (TLS) or Internet Protocol Security (IPsec). Any requesters that are not authorized to access subscription identifiers remain limited to using the corresponding pseudonym identifiers, as the resolver 20 will not resolve those pseudonym identifiers into subscription identifiers for unauthorized requesters.

Once an (authorized) requester 26 receives the resolved identifier 30, processing 250 by the requester 26 in some embodiments then further includes performing one or more actions using the resolved identifier 30 (Block 280). The one or more actions may pertain, for instance, to charging, lawful interception, or the like.

Figure 3:
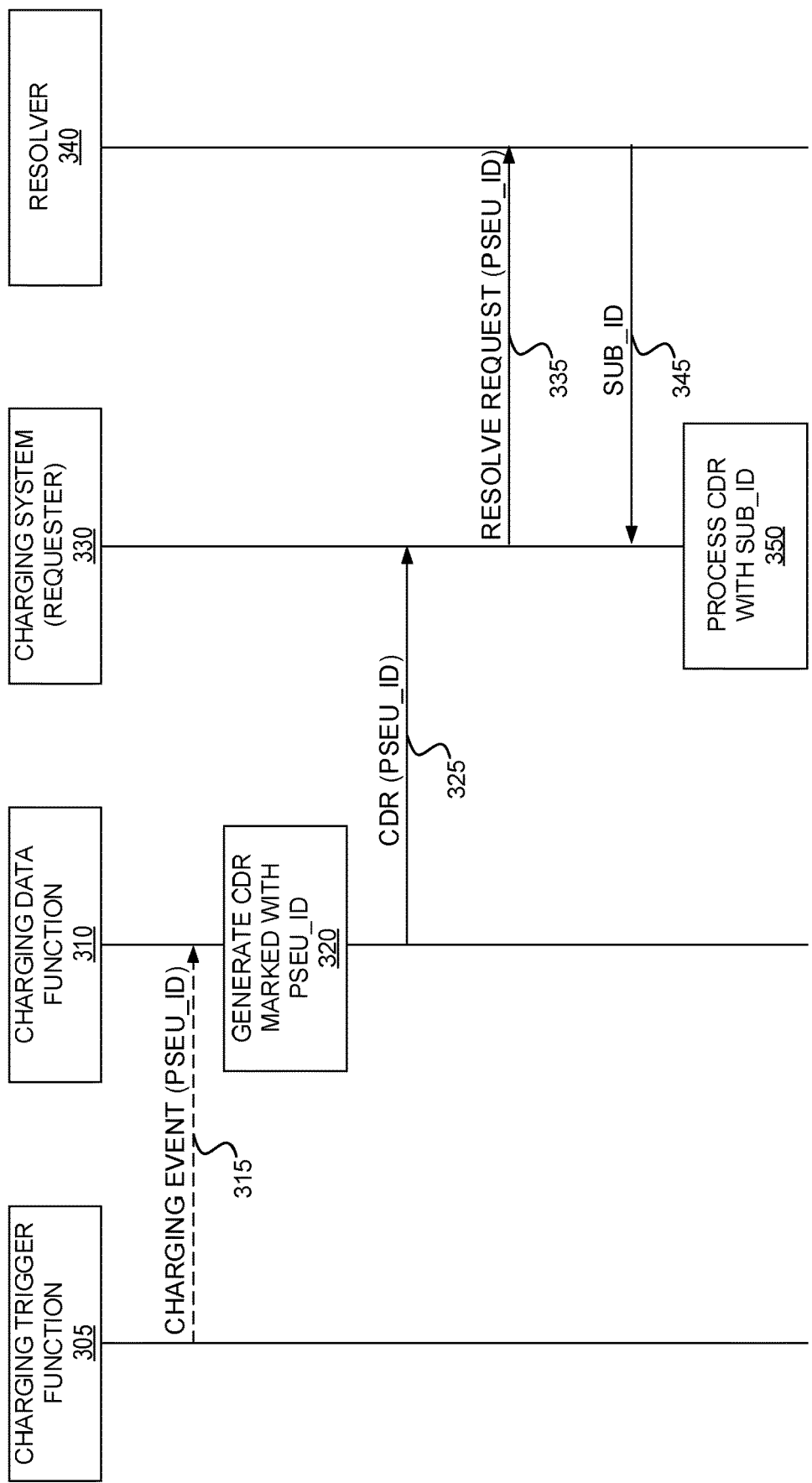

FIG. 3 illustrates an example in a charging context. As shown in FIG. 3, a charging trigger function (CTR) 305 may notify a charging data function (CDF) 310 that a charging event has occurred for a particular pseudonym identifier, PSEU_ID (Step 315). Such a charging event may occur for instance when resource usage in the system 10 is attributable to the particular pseudonym identifier and amounts to a billable event (e.g., a voice call of a certain duration, the transport of a certain volume of data, etc.). Notably, though, the CTR 305 indicates the charging event as being associated with a particular pseudonym identifier, not the corresponding subscriber identifier, as the subscriber identifier in some embodiments is not revealed to the CTR 305. In response to the charging event, the CDF 310 generates a charging data record (CDR) that is marked with the particular pseudonym identifier (Step 320) and sends the CDR (Step 325) to a charging system 330 as marked with the pseudonym identifier. The charging system 330 correspondingly receives the CDR that is marked as a charging record for the pseudonym identifier. Acting as requester 26 in FIG. 3, the charging system 330 then transmits a request to resolver 340 to resolve the particular pseudonym identifier (Step 335), i.e., in order to determine which subscription identifier the charging record is for. In response to the request, the resolver 340 transmits the subscription identifier for which the particular pseudonym identifier serves in the core network as a pseudonym (Step 345). The charging system 330 then processes the CDR with the subscription identifier (Step 350). The charging system 330 may for instance map the CDR to the subscription identifier returned from the resolver 340, e.g., in order to bill a particular subscription for the charging event.

As this example demonstrates, some embodiments herein use pseudonym identifiers to hide subscription identifiers from the CTR 305 and/or CDF 310, while maintaining charging functionality by selectively revealing the subscription identifiers to the charging system 330. In one or more New Radio (NR) embodiments, for instance, the CTR 305 and/or CDF 310 are implemented by core network equipment that performs a user plane function (UPF) as an external protocol data unit (PDU) session point of interconnect to data network 14, and the charging system 330 is implemented by core network equipment that performs a policy control function (PCF). In this case, then, the embodiments hide subscription identifiers from the UPF while selectively revealing subscription identifiers to the PCF.

Figure 4:
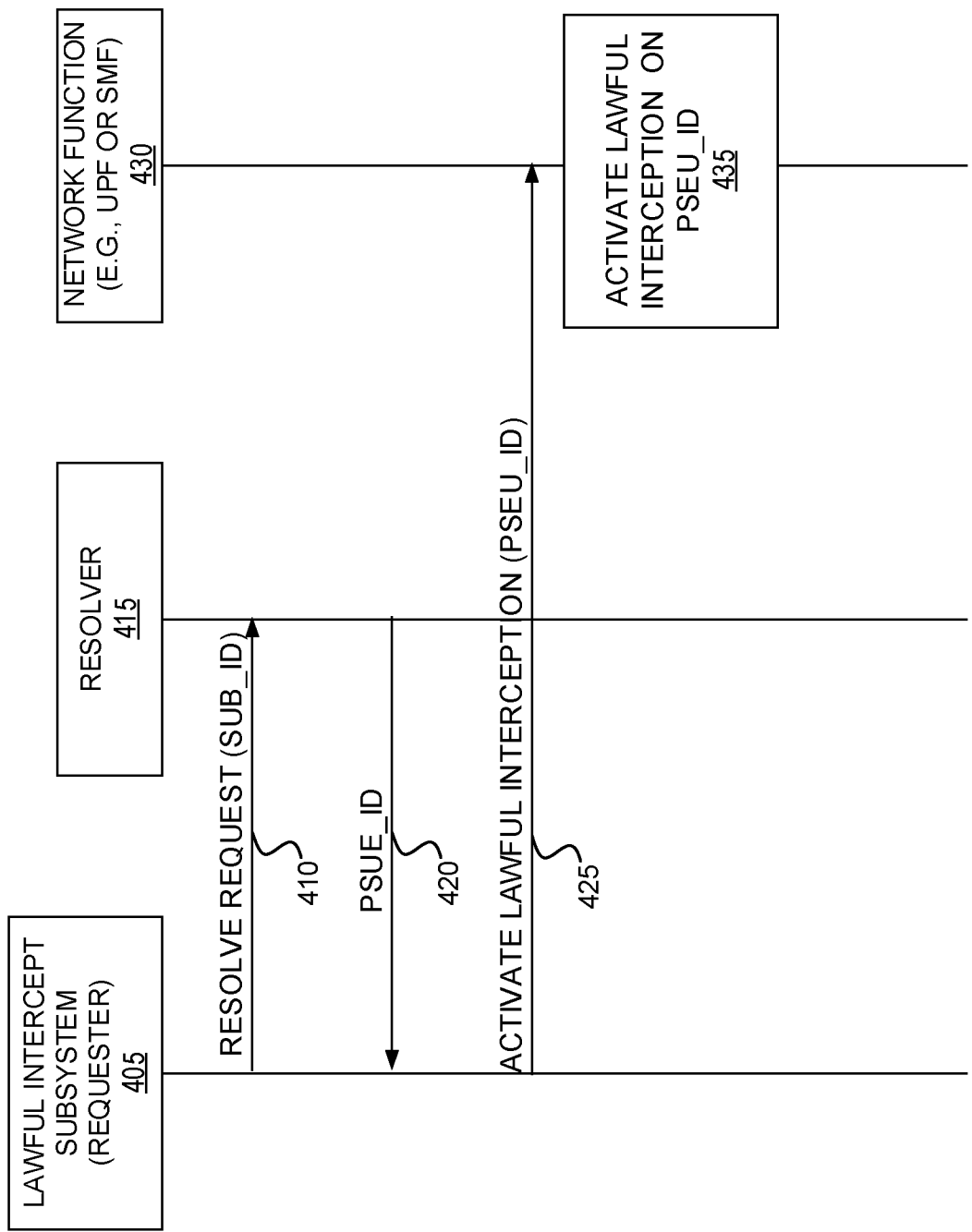

FIG. 4 illustrates another example in a context for performing lawful interception, which involves passive collection of information related to services provided to a subscriber targeted for interception and/or active service invocation in support of lawfully authorized surveillance activities, relating to a particular target. As shown in FIG. 4, a lawful intercept subsystem 405 needs to activate lawful interception for a particular subscription identifier, SUB-ID. Some embodiments herein enable the lawful intercept subsystem 405 to active such lawful interception on a certain network function (e.g., UPF or session management function, SMF) 430, while still concealing the subscription identifier from that network function. In this regard, the lawful intercept subsystem 405, acting as requester 26 in FIG. 3, transmits a request to resolver 415 to resolve the particular subscription identifier (Step 410). In response to the request, the resolver 415 transmits the pseudonym identifier, PSUE-ID, that serves in the core network 10A as a pseudonym for the particular subscription identifier (Step 420). The lawful intercept subsystem 405 then directs the network function 430 to activate lawful interception on the pseudonym identifier (Step 425). The lawful intercept subsystem 405 in this regard may transmit the pseudonym identifier to the network function 430 for activating lawful interception at the network function 430 using the pseudonym identifier. The network function 430 correspondingly activates lawful interception on the pseudonym identifier (Step 435), while remaining ignorant of the corresponding subscription identifier. In one or more NR embodiments where the network function 430 is the UPF or the SMF, this means that the system 10 may hide subscription identifiers from the UPF and/or SMF, while selectively revealing subscription identifiers to the lawful intercept subsystem 405.

Note that in some embodiments at least some portions of the mapping 24 between pseudonym identifiers and subscription identifiers may be configured at the resolver 20, in advance of a need for those mapping portions. For example, in one embodiment, at least some portions of the mapping 24 are configured at the resolver 20 even before a request is received to perform lawful interception on any of the subscription identifiers in that mapping 24. This may for instance mask whether and/or how the mapping 24 is being used in the core network 10A, e.g., for lawful interception.

Consider for example a case of a roaming user with home routing. In this case, the lawful intercept subsystem 405 may be configured to avoid effectively notifying the resolver 20 if the resolver is located in the visited network that a certain subscription identifier is under lawful interception in the home network. Accordingly, in some embodiments, a secondary resolver in the home network is provided by the resolver in the visited network with at least some portions of the mapping 24 regardless of whether or not the subscription identifier is under lawful interception.

Although embodiments above have focused largely on conversion or translation between subscription identifiers and pseudonym identifiers as enabling pseudonym identifier usage, embodiments herein also include core network equipment, nodes, and/or functions that use the pseudonym identifiers, e.g., without being privy to subscription identifiers. Indeed, some functionality and/or signaling in the core network 10A may employ a pseudonym identifier instead of a subscription identifier, as may be conventional. For example, a pseudonym identifier may be used in messages, such as e.g. an Authentication-Information-Request, an Update-Location-Request, or other DIAMETER protocol messages between mobility management entity (MME) and home subscriber server (HSS), or similar messages in NR. As another example, a pseudonym identifier may be used in messages, such as e.g. Create Session Request, Downlink Data Notification, or other General Packet Radio Service Tunneling Protocol for Control Plane (GTP-C) messages between MME and serving gateway (SGW), or similar messages in NR. As yet another example, a pseudonym identifier may be used in messages, such as e.g. Create Session Request, Trace Session Activation, Resume Notification, or other GTP-C messages between SGW and packet gateway (PGW), or similar messages in NR.

Note also that although some embodiments have been illustrated with respect to a single generator 18, other embodiments herein may employ multiple generators. In these embodiments, a pseudonym identifier may be formed from multiple parts, one of which may identify which generator generated the pseudonym identifier and another one of which identifies the subscription identifier for the pseudonym identifier serves as a pseudonym for according to a mapping at the identified generator. In a concrete example where a generator is implemented by an AMF in 5G or a mobility management entity (MME) in 4G, a pseudonym identifier may be formed from a first part that is either a globally unique AMF identifier (GUAMI) or a globally unique MME identifier (GUMMEI), and from a second part that is a random-appearing number. In alternative embodiments, though, a pseudonym identifier may be generated as a fairly long and sufficiently random-appearing that it is unlikely that two pseudonym identifiers would have the same value. In any of these embodiments, though, the pseudonym identifier may for instance be generated by applying a pseudo random permutation (PRP) to a pseudonym embryo that is the starting point or origin of a pseudonym to be created for the subscriber identifier. No matter the particular implementation, though, pseudonym identifiers herein may be specifically generated for the purpose of hiding the subscription identifiers from certain nodes, equipment, or functions in the core network, e.g., those that do not strictly need the subscription identifiers. The pseudonym identifiers in this regard may be generated so as not to be updated too frequently (e.g., so as to avoid unnecessary overhead), so as to not be easily mapped back to corresponding subscription identifiers by unauthorized parties, but to be easily mapped back to subscription identifiers by authorized parties.

On a related note, at least some embodiments herein account for a lifetime of a pseudonym identifier extending beyond that provided by a range of pseudonym identifier values, e.g., due to there being a finite space of possible pseudonyms. In some embodiments, for example, a timestamp serves to distinguish pseudonym identifiers generated and/or mapped at different times, but with the same values. A pseudonym identifier and a timestamp at which it was generated may therefore map to a particular subscription identifier for which the pseudonym identifier serves as a pseudonym. As this example demonstrates, then, one or more other parameters, such as e.g. a timestamp, may be mapped together with the pseudonym identifier to a particular subscription identifier.

Accordingly, in some embodiments, a combination of a pseudonym identifier and a timestamp are mapped to a particular subscription identifier in the mapping 24. In this case, the request 28 may include not only the provided identifier but also a timestamp. The corresponding resolved identifier 30 may then be provided in response to the request if the timestamp in the request meets a matching condition with respect to the timestamp in the mapping 24 (e.g., matches exactly or is within a defined range of). For example, where the request 28 includes a pseudonym identifier and a timestamp, the resolver 20 may respond with the corresponding subscription identifier if the timestamp in the request matches (or is within a defined range of) the timestamp at which the provided pseudonym identifier was generated or mapped to the subscription identifier by the generator 18. In these and other embodiments, then, the generator 18 not only propagates pseudonym identifiers amongst core network equipment, but also propagates the associated timestamps at which the pseudonym identifier were generated and/or mapped to subscription identifiers. The generator 18 may alternatively, or additionally, propagate other information as well, including for instance a message authentication code (MAC), a digital signature, a certificate, an identifier, etc. for various operational or security reasons. On a related note, the requester 26 may signal along with the request 28 other information as well, including for instance a message authentication code (MAC), a digital signature, a certificate, an identifier, etc. Similarly, the resolver 20 may signal along with the resolved identifier 30 e.g. a message authentication code (MAC), a digital signature, a certificate, an identifier, etc. These and other signals, information, or indications may be conveyed, using protocol messages directly between endpoints, via message piggybacking, using tunneling via other parties, or the like.

Note further that although some embodiments have been illustrated using equipment and/or functionality separated in a particular way, such need not be the case in other embodiments. For example, in some NR embodiments, the AMF and SMF may be considered to be part of the same control function, e.g., according to a certain trust assumption. Considered part of the same set of trusted controller functions, the AMF and SMF in this case may pass subscription identifiers between themselves (regardless of being in the home or visited network) together with the pseudonym identifiers. Using the examples above, then, a lawful intercept subsystem in the home network may activate lawful interception for a subscription identifier.

Note in addition that the generator 18, resolver 20, and/or requester 26 may each be implemented by any core network equipment in the core network 10A, whether in the home or serving/visited network. The generator 18, resolver 20, and/or requester 26 may for instance be implemented as part of another core network function (e.g., AMF), or as a standalone function. Moreover, the generator 18, resolver 20, and/or requester 26 may be implemented by the same or different core network equipment as one another.

A wireless communication device 12 is any type of radio node capable of communicating with a radio network node over radio signals. A wireless communication device 12 may therefore refer e.g. to a machine-to-machine (M2M) device, a machine-type communications (MTC) device, a NB-IoT device, etc. The wireless communication device 12 may also be a UE, however it should be noted that the UE does not necessarily have a "user" in the sense of an individual person owning and/or operating the device. A wireless communication device 12 may also be referred to e.g. as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction. The terms User Equipment (UE), device, wireless device, mobile, mobile device, phone, mobile phone are used interchangeably to denote a wireless device.

A USIM may be a removable smart-card or a module soldered to a circuit-board in the device or any other physical or logical separate unit from the device.

Generally, a core network node herein is any type of node within a core network 10A of the wireless communication system 10. A core network node may include for instance e.g. a node that implements an access and mobility function (AMF), a session management function (SMF), or any other core network function in a 5G or New Radio (NR) system. Moreover, a core network node may comprise or be realized/instantiated with equipment in the core network 10A that may include processing circuitry, memory, etc.

Note that the generator 18 as described above may perform the processing herein by implementing any suitable functional means or units. In one embodiment, for example, the generator 18 comprises respective circuits or circuitry configured to perform the steps shown in FIG. 2A. The circuits or circuitry in this regard may comprise circuits dedicated to performing certain functional processing and/or one or more microprocessors in conjunction with memory. In embodiments that employ memory, which may comprise one or several types of memory, such as e.g. read-only memory (ROM), random-access memory, cache memory, flash memory devices, optical storage devices, etc., the memory stores program code that, when executed by the one or more processors, carries out the techniques described herein.

Figure 5A:
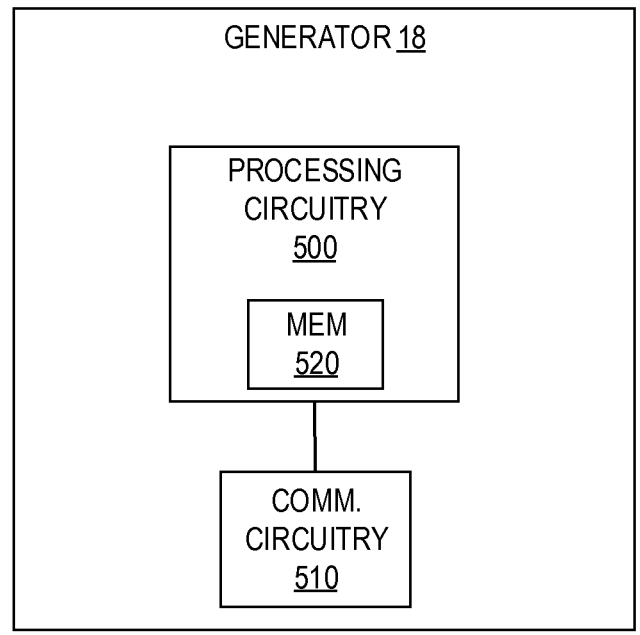

FIG. 5A illustrates additional details of a generator 18 in accordance with one or more embodiments. As shown, the generator 18 includes processing circuitry 500 and communication circuitry 510. The communication circuitry 510 is configured to transmit and/or receive information to and/or from one or more other nodes, e.g., via any communication technology. The processing circuitry 500 is configured to perform processing described above, e.g., in FIG. 2A, such as by executing instructions stored in memory 520.

Figure 5B:
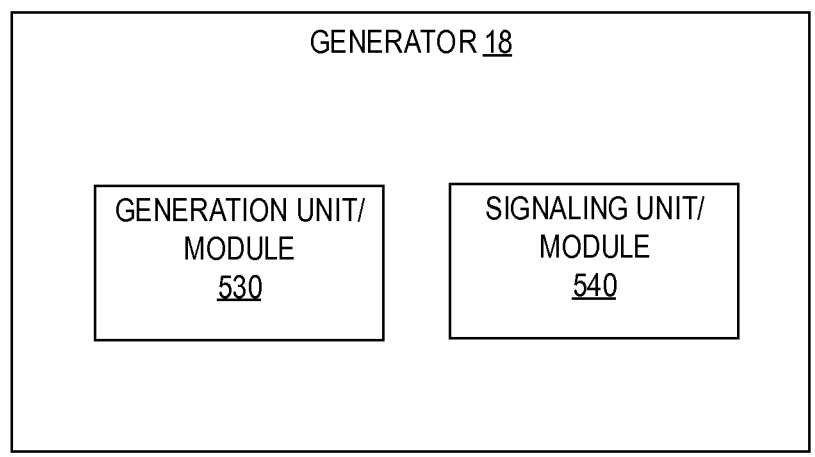

FIG. 5B shows that the generator 18 in some embodiments implements various functional means, modules or units, e.g., via the processing circuitry 500 in FIG. 5A. These functional means, modules or units may include different means, modules or units for performing different respective steps in FIG. 2A. FIG. 5B for example shows the generator 18 as including a generation unit or module 530 for generating a pseudonym identifier to serve as a pseudonym for a subscription identifier. Also shown in some embodiments is a signaling unit or module 540 for signaling the pseudonym identifier and/or a mapping of the pseudonym identifier to the subscription identifier to one or more other core network nodes, equipment, or functions.

Note also that the resolver 20 described above may perform the processing herein by implementing any suitable functional means or units. In one embodiment, for example, the resolver 20 comprises respective circuits or circuitry, configured to perform the steps shown in the figures. The circuits or circuitry in this regard may comprise circuits dedicated to performing certain functional processing and/or one or more microprocessors in conjunction with memory. In embodiments that employ memory, which may comprise one or several types of memory, such as e.g. read-only memory (ROM), random-access memory, cache memory, flash memory devices, optical storage devices, etc., the memory stores program code that, when executed by the one or more processors, carries out the techniques described herein.

Figure 6A:
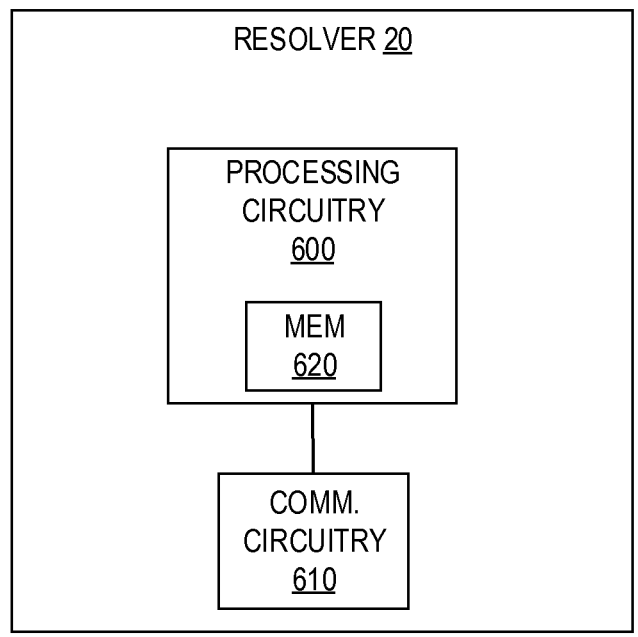

FIG. 6A illustrates additional details of resolver 20, in accordance with one or more embodiments. As shown, the resolver 20 includes processing circuitry 600 and communication circuitry 610. The communication circuitry 610 is configured to communicate with the requester 28, e.g., via one or more interfaces. The processing circuitry 600 is configured to perform processing as described above, e.g., in FIG. 2B, such as by executing instructions stored in memory 620.

Figure 6B:
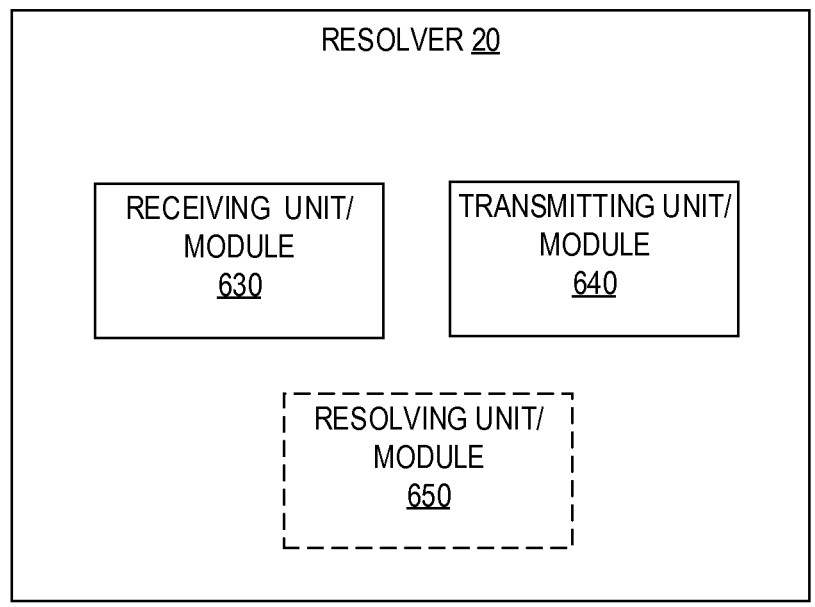

FIG. 6B shows that the resolver 20 in some embodiments implements various functional means, modules or units, e.g., via the processing circuitry 600 in FIG. 6A. These functional means, modules or units may include different means, modules or units for performing different respective steps in the above figures. As shown, for instance, resolver 20 includes a receiving unit or module 630 for receiving from requester 26 request 28 to resolve a provided identifier, and a transmitting unit or module 640 for transmitting to requester 26 as a response to the request 28 the resolved identifier 30. Also shown as included in some embodiments is a resolving unit or module 650 for resolving the provided identifier into the resolved identifier 30, e.g., using a defined mapping 24.

Note further that the requester 26 described above may perform the processing herein by implementing any functional means, modules or units. In one embodiment, for example, the requester 26 comprises respective circuits or circuitry configured to perform the steps shown in the figures. The circuits or circuitry in this regard may comprise circuits dedicated to performing certain functional processing and/or one or more microprocessors in conjunction with memory. In embodiments that employ memory, which may comprise one or several types of memory, such as e.g. read-only memory (ROM), random-access memory, cache memory, flash memory devices, optical storage devices, etc., the memory stores program code that, when executed by the one or more processors, carries out the techniques described herein.

Figure 7A:
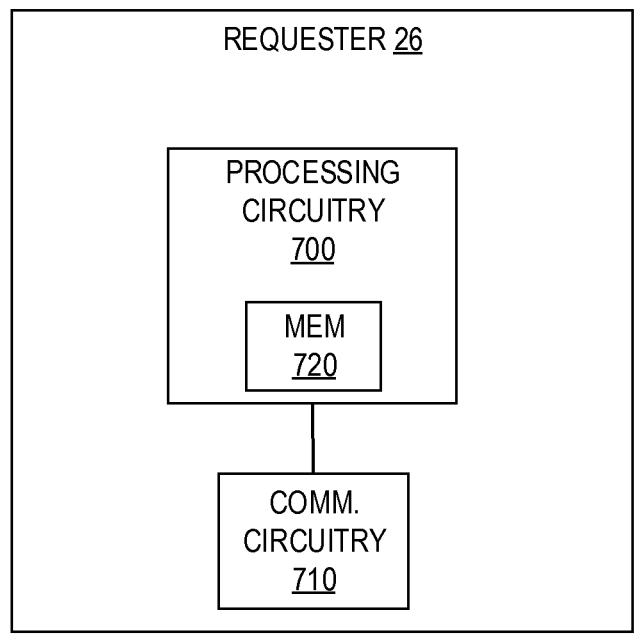

FIG. 7A illustrates additional details of requester 26 in accordance with one or more embodiments. As shown, the requester 26 includes processing circuitry 700 and communication circuitry 710. The communication circuitry 710 is configured to communicate with the resolver 20, e.g., via one or more interfaces. The processing circuitry 700 is configured to perform processing described above, e.g., in FIG. 2C, such as by executing instructions stored in memory 720.

Figure 7B:
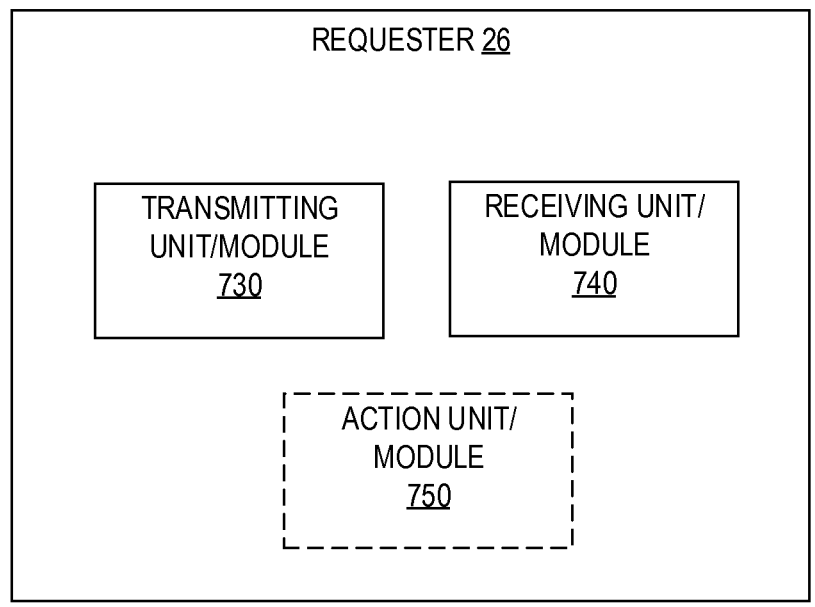

FIG. 7B shows that the requester 26 in some embodiments implements various functional means, modules or units, e.g., via the processing circuitry 700 in FIG. 7A. These functional means, modules or units may include different means, modules or units for performing different respective steps in the above figures. As shown, for instance, requester 26 includes a transmitting unit or module 730 for transmitting to the resolver 20 a request 28 to resolve a provided identifier, and a receiving unit or module 740 for receiving from requester 20 as a response to the request 28 the resolved identifier. Also shown as included in some embodiments is an optional action unit or module 750 for performing one or more actions using the resolved identifier 30.

Those skilled in the art will also appreciate that embodiments herein further include corresponding computer programs.

A computer program comprises instructions which, when executed on at least one processor of a generator 18, resolver 20, or requester 26, cause the generator 18, resolver 20, or requester 26 to carry out any of the respective processing described above. A computer program in this regard may comprise one or more code modules, corresponding to the means, modules or units described above.

Embodiments further include a carrier containing such a computer program. This carrier may comprise e.g. one of an electronic signal, optical signal, radio signal, or computer readable storage medium.

In this regard, embodiments herein also include a computer program product stored on a non-transitory computer readable (storage or recording) medium and comprising instructions that, when executed by a processor of a generator 18, resolver 20, or requester 26, cause the generator 18, resolver 20, or requester 26 to perform as described above.

Embodiments further include a computer program product, comprising program code portions for performing the steps of any of the embodiments herein when the computer program product is executed by a computing device. This computer program product may be stored on a computer readable recording medium.

The invention claimed is:

1. A method, performed by a resolver in a core network of a wireless communication system, the method comprising the resolver:

receiving, from a requester in the core network, a request to resolve a provided identifier that is one of a subscription identifier and a pseudonym identifier, wherein the pseudonym identifier serves in the core network as a pseudonym for the subscription identifier and is not communicated externally to the core network; and transmitting, to the requester as a response to the request, a resolved identifier that is the other of the subscription identifier and the pseudonym identifier.

2. The method of claim 1, further comprising resolving the provided identifier into the resolved identifier using a mapping that maps different subscription identifiers to different respective pseudonym identifiers that serve as pseudonyms for the different subscription identifiers in the core network and are not communicated externally to the core network.

3. The method of claim 2, further comprising configuring the mapping at the resolver before a request is received to perform lawful interception on any of the different subscription identifiers.

4. The method of claim 1, further comprising a generator in the core network generating the pseudonym identifier to serve as the pseudonym for the subscription identifier.

5. The method of claim 4, further comprising the generator updating the pseudonym identifier serving as the pseudonym for the subscription identifier, responsive to a wireless communication device associated with the subscription identifier initially registering with or initially attaching to the wireless communication system.

6. The method of claim 1, wherein the provided identifier is the subscription identifier and the resolved identifier is the pseudonym identifier.

7. The method of claim 1, wherein the pseudonym identifier includes multiple parts, including:
a part that identifies one of multiple generators in the core network which generated the pseudonym identifier; and
a part that identifies the subscription identifier for which the pseudonym identifier serves as a pseudonym according to a mapping at the identified generator.

8. The method of claim 1:
wherein a combination of the pseudonym identifier and a timestamp are mapped to the subscription identifier in a defined mapping;
wherein the request includes the provided identifier and a timestamp; and
wherein the resolved identifier is provided in response to the request if the timestamp in the request meets a matching condition with respect to the timestamp in the defined mapping.

9. The method of claim 1, wherein the pseudonym identifier is a type of identifier that is periodically updated.

10. The method of claim 1, wherein the resolver is implemented by core network equipment that performs an access and mobility management function (AMF).

11. The method of claim 1, wherein the subscription identifier is at least a portion of an International Mobile Subscriber Identity (IMSI).

12. A method, performed by a requester in a core network of a wireless communication system, the method comprising the requester:
transmitting, to a resolver in the core network, a request to resolve a provided identifier that is one of a subscription identifier and a pseudonym identifier, wherein the pseudonym identifier serves in the core network as a pseudonym for the subscription identifier and is not communicated externally to the core network; and
receiving, from the resolver as a response to the request, a resolved identifier that is the other of the one of a subscription identifier and the pseudonym identifier.

13. The method of claim 12, further comprising performing one or more actions using the resolved identifier.

14. The method of claim 13, wherein the one or more actions include performing lawful interception.

15. The method of claim 13, wherein the one or more actions include transmitting the resolved identifier to core network equipment in the core network for activating lawful interception at the core network equipment using the resolved identifier.

16. The method of claim 13, further comprising:
receiving, at the requester, a charging record that is marked as a charging record for the pseudonym identifier;
wherein the transmitting comprises transmitting the request to the resolver with the pseudonym identifier as the provided identifier in order to determine which subscription identifier the charging record is for; and
wherein the one or more actions include mapping the charging record to the subscription identifier returned as the resolved identifier.

17. The method of claim 12, wherein the provided identifier is the subscription identifier and the resolved identifier is the pseudonym identifier.

18. The method of claim 12, wherein the provided identifier is the pseudonym identifier and the resolved identifier is the subscription identifier.

19. A resolver configured for use in a core network of a wireless communication system, the resolver comprising:
processing circuitry;
memory containing instructions executable by the processing circuitry whereby the resolver is operative to:
receive, from a requester in the core network, a request to resolve a provided identifier that is one of a subscription identifier and a pseudonym identifier, wherein the pseudonym identifier serves in the core network as a pseudonym for the subscription identifier and is not communicated externally to the core network; and
transmit, to the requester as a response to the request, a resolved identifier that is the other of the subscription identifier and the pseudonym identifier.

20. A requester configured for use in a core network of a wireless communication system, the requester comprising:
processing circuitry;
memory containing instructions executable by the processing circuitry whereby the requester is operative to:
transmit, to a resolver in the core network, a request to resolve a provided identifier that is one of a subscription identifier and a pseudonym identifier, wherein the pseudonym identifier serves in the core network as a pseudonym for the subscription identifier and is not communicated externally to the core network; and
receive, from the resolver as a response to the request, a resolved identifier that is the other of the subscription identifier and the pseudonym identifier.

* * * * *